Horton & Milligan.
Spirit-Meter for Distilleries.
Nº 73099      Patented Jan. 7, 1868.
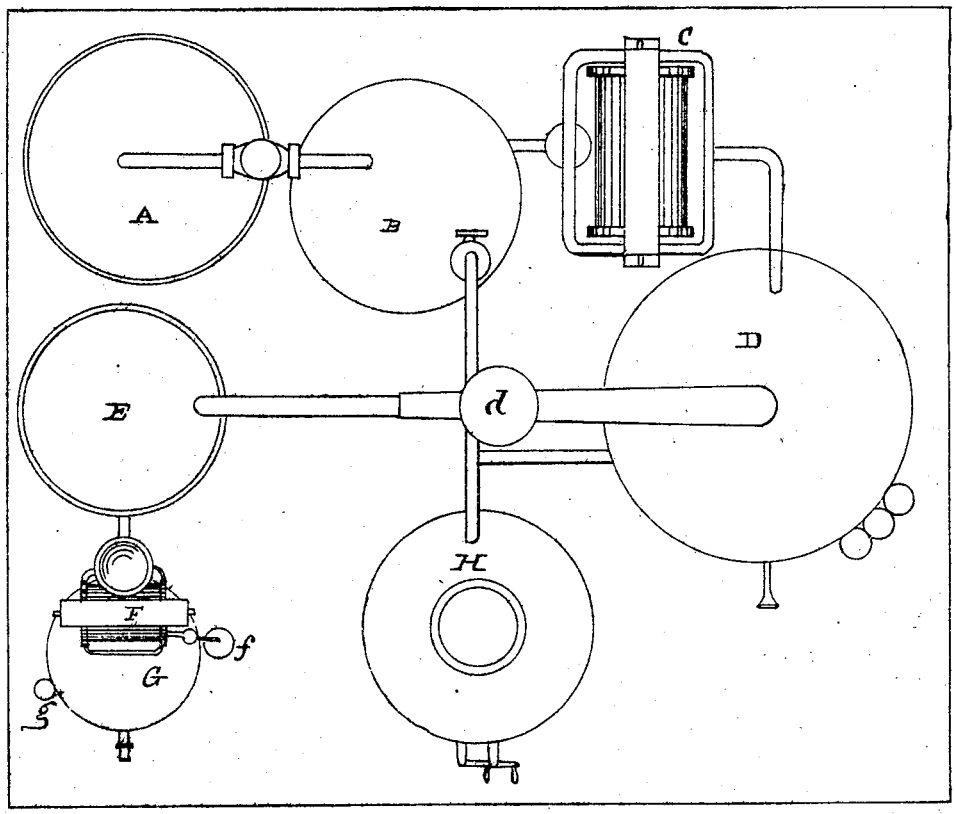
Witnesses
Jos. L. Coombs
John A. Bassett
Inventors.
Jacob C. Horton
James Milligan
By J. L. Coombs
Attorney

United States Patent Office.

JACOB C. HORTON, OF NEW YORK, AND JAMES MILLIGAN, OF BROOKLYN, NEW YORK.

*Letters Patent No. 73,099, dated January 7, 1868.*

IMPROVEMENT IN SPIRIT-METERS FOR DISTILLERIES.

*The Schedule referred to in these Letters Patent and making part of the same.*

TO ALL WHOM IT MAY CONCERN:

Be it known that we, JACOB C. HORTON, of the city, county, and State of New York, and JAMES MILLIGAN, of Brooklyn, in the county of Kings, and State of New York, have invented a new and useful Method of Ascertaining the Quantity of Spirits Produced in Distilleries, for the purpose of collecting taxes thereon; and we do hereby declare that the following is a full, clear, and exact description thereof, reference being had to the accompanying drawing, and to the letters of reference marked thereon.

The drawing represents a plan view of a distillery, with our invention applied thereto.

The numerous and extensive frauds practised by distillers to evade the revenue laws render it a matter of great importance to devise some effective method of ascertaining with certainty the quantity of spirits produced in each distillery. Many plans have been proposed for ascertaining said quantity by the use of enclosed meters, accessible to Government inspectors only, to automatically weigh or measure and register the amount of liquor passing from the still. All these plans, however, are subject to the objection that, by many ingenious devices, liquor may be withdrawn from the still without passing through the meter; or the meter itself may be tampered with by means of false keys and other fraudulent contrivances, so that it will not truly indicate the quantity of liquor passing through it.

Our method consists in combining with an automatic meter to measure or weigh the liquor passing from the still, and register the amount thereof, another automatic meter to measure and register the amount of beer passing from the fermenting-cisterns to the still.

It has been found, by long experience in England, that the fairest and most accurate mode of taxing the spirits produced by distilleries is by actual measurement and weight of the wort before distillation, and thereby ascertaining the quantity of saccharine matter that has to undergo decomposition by fermentation, or the amount of alcohol which a given amount of the fermented beer will produce by distillation; but it is believed that the English system of gauging and weighing the beer in the mash-tubs is liable to serious objections, on account of facilities which it presents for the practice of frauds, or, at least, that it would so prove in this country, on account of the general want of a knowledge of distillation on the part of our revenue officers; but, if the amount of beer passing from the fermenting-cisterns to the still can be accurately ascertained by an automatic registering-meter, through which it must pass, we thereby gain the advantages of the English system, without encountering the most serious objections thereto.

It is a well-ascertained fact that, if the wort contains more or less than about sixteen per cent. of saccharine matter, as indicated by the sacchrometer, there will be an undue loss of alcohol in its distillation. Hence it is a safe rule to estimate the quantity of spirits produced from a given quantity (by measurement) of the beer on the basis of sixteen per cent. of saccharine matter in the wort. The distiller cannot, by using less water and more grain in his mash, get any more alcohol from a gallon of beer than is due to wort of about sixteen per cent.; and, by diluting his beer below that point, he would not only lose in the quantity of alcohol obtained from a given amount of grain, but in the measurement of the beer itself.

Our method does not consist, however, merely in using a meter to measure the beer passing into the still as a means of ascertaining the quantity of alcohol produced, but in using said meter in combination with a meter to measure and indicate the quantity of liquor actually produced by distillation and run from the still, so that one meter will be a check upon the other. The quantity of alcohol due to a given quantity of beer being approximately known, any unusual variation in the registers of the two meters, when thus used in combination, will afford evidence that one or the other of said meters has been tampered with, or that fraud has been in some way committed; and, even if both meters should be tampered with, they must be so tampered with that their separate results will correspond with each other, or the fraud will become apparent.

In the accompanying drawings, A is the mash-tub, B the mungé or vacuum-pump, C the beer-meter, D the still, $d$ the doubler, E the cooler, F the spirit-meter, G the receiver, and H the boiler. As there is nothing new in the construction of the distilling-apparatus, a more particular description of it is deemed unnecessary.

The beer-meter C is so constructed, located, and arranged, that all the beer passing from the mungé into the still must necessarily pass through it; and it is provided with a dial-register, to indicate, at all times, the number of gallons that have passed through it since last inspected. It is so enclosed, under lock and key, as to be accessible only to Government inspectors provided with proper keys.

The meter F is so constructed and placed that all the spirits passing from the worm to the receiver must necessarily pass through it, and is provided with a register, and enclosed, like meter C. It is also provided with a sample-gauge, to test the average strength of the spirits passing through it, consisting of a receptacle, $f$, into which a small jet of spirits is injected at each stroke of the meter, so that the spirits in this gauge will always be a fair average sample of the liquor which has passed through the meter since it was last emptied; and, by a comparison of this sample with the number of wine-gallons indicated by the meter's register, the number of proof-gallons which have passed the meter will be readily ascertained.

It will be seen that the two meters, acting together as described, will operate as checks upon each other, and thereby greatly increase the difficulty of deceiving the inspectors as to the amount of spirits actually manufactured. There are many devices by means of which a portion of the distilled spirits may be drawn from the still or the condenser without passing through the spirit-meter; but, with a beer-meter arranged as herein described, it will be much more difficult to pass any of the beer into the still without passing it through the beer-meter; and it is manifest that the distiller would have no object in abstracting the beer before it passes the meter, unless he could introduce it into the still, as it is not a merchantable commodity. Hence we regard the method of measuring the beer, by passing it through an automatic registering-meter on its way from the fermenting-cistern to the still, as a more effective means of detecting and preventing frauds than any method that can be devised on the principle of merely measuring the distilled spirits passing from the worm.

It is further manifest that, if beer of a uniform gravity, say of sixteen per cent., be passed through the beer-meter, the register of that meter will afford the means of ascertaining the number of proof-gallons of spirits produced by distillation.

We prefer to use the meter of Jacob C. Horton and Samuel K. Hawkins, as described in their patent of September 10, 1867, in carrying our method into effect, but do not limit ourselves to that, in exclusion of all others, as there may be other meters that would answer the purpose.

What we claim as our invention, and desire to secure by Letters Patent, is—

1. The method of ascertaining the quantity of spirits produced in a distillery in a given time, by using, in combination with an automatic meter to measure the spirits passing from the worm, another automatic meter to measure the beer passing from the fermenting-cisterns to the still, said meters being arranged and provided with automatic registers, substantially as described.

2. We also claim as our invention the method of ascertaining the quantity of spirits produced by a distillery in a given time, by passing the beer through an automatic registering-meter on its way from the fermenting-cisterns to the still, whether in combination with a meter to measure the distilled spirits or not, substantially as herein described.

JACOB C. HORTON,
JAMES MILLIGAN.

Witnesses:
   J. J. COOMBS,
   JOS. L. COOMBS.